(12) United States Patent
Turner et al.

(10) Patent No.: US 6,367,697 B1
(45) Date of Patent: Apr. 9, 2002

(54) READER ARRANGEMENT FOR AN ELECTRONIC IDENTIFICATION SYSTEM HAVING A PLURALITY OF READER HEADS FOR ENERGIZING TRANSPONDERS

(75) Inventors: Christopher Gordon Gervase Turner; Johan Dawid Kruger; David Edwin Proctor, all of Gauteng (ZA)

(73) Assignee: Supersensor (Proprietary) Limited, Goodwood (ZA)

(*) Notice: Subject to any disclaimer, the term of this patent is extended or adjusted under 35 U.S.C. 154(b) by 0 days.

(21) Appl. No.: 09/143,711

(22) Filed: Aug. 28, 1998

(30) Foreign Application Priority Data

Aug. 28, 1997 (ZA) .............................................. 97/7742
Mar. 10, 1998 (ZA) .............................................. 98/2024

(51) Int. Cl.$^7$ .............................................. G06K 7/00
(52) U.S. Cl. ...................... 235/440; 235/439; 340/10.3
(58) Field of Search ................. 235/440, 436, 235/435; 340/10.1, 10.2, 10.3, 10.4, 10.5, 10.6

(56) References Cited

U.S. PATENT DOCUMENTS

| | | | |
|---|---|---|---|
| 4,431,913 A | | 2/1984 | Sekimoto et al. |
| 4,636,950 A | * | 1/1987 | Caswell et al. ............. 364/403 |
| 5,131,038 A | * | 7/1992 | Puhl et al. .................... 380/23 |
| 5,198,823 A | | 3/1993 | Litchford et al. |
| 5,221,831 A | * | 6/1993 | Geiszler ..................... 235/440 |
| 5,231,273 A | * | 7/1993 | Caswell et al. ............. 235/385 |
| 5,258,605 A | | 11/1993 | Metlitsky et al. |
| 5,258,766 A | * | 11/1993 | Murdoch ..................... 343/742 |
| 5,280,286 A | * | 1/1994 | Williamson .................. 342/44 |
| 5,305,008 A | | 4/1994 | Turner et al. |
| 5,382,778 A | * | 1/1995 | Takahira et al. ............. 235/380 |
| 5,477,215 A | * | 12/1995 | Mandelbaum ......... 340/825.34 |
| 5,485,154 A | * | 1/1996 | Brooks et al. ................. 342/44 |
| 5,500,650 A | * | 3/1996 | Snodgrass et al. ............. 342/42 |
| 5,541,604 A | | 7/1996 | Meier |
| 5,557,085 A | * | 9/1996 | Tyren et al. ................. 235/380 |
| 5,591,951 A | | 1/1997 | Doty |
| 5,621,199 A | * | 4/1997 | Calari et al. ................. 235/375 |
| 5,698,837 A | * | 12/1997 | Furuta ......................... 235/492 |
| 5,773,803 A | * | 6/1998 | Fukuta ......................... 235/375 |
| 5,812,065 A | * | 9/1998 | Schott et al. .......... 340/825.54 |
| 5,814,777 A | * | 9/1998 | Rifkin ......................... 235/379 |
| 6,060,815 A | * | 3/2000 | Nysen ......................... 310/318 |
| 6,107,921 A | * | 8/2000 | Eberhardt et al. ....... 340/572.7 |

FOREIGN PATENT DOCUMENTS

| | | | | |
|---|---|---|---|---|
| EP | 467 036 | | 5/1991 | |
| EP | 494 114 | | 1/1992 | |
| EP | 642096 | | 7/1994 | |
| JP | 40-2093390 | * | 4/1990 | ................. 235/384 |
| JP | 08-184668 A | * | 7/1996 | |
| JP | 09-018381 A | * | 1/1997 | |
| WO | 91-20067 | * | 12/1991 | ................. 235/384 |

\* cited by examiner

*Primary Examiner*—Michael G. Lee
*Assistant Examiner*—Diane L. Lee
(74) *Attorney, Agent, or Firm*—Merchant & Gould P.C.

(57) ABSTRACT

A reader arrangement 22 for an electronic identification system includes a plurality of reader heads 22.1 to 22.4 for energizing transponders 28.1 to 28.n to be read, and a controller 29 therefor. The controller 29 switches activation of the reader heads in a multi-phase sequential pattern including a first phase for activating a first set 22.1 and 22.3 of the reader heads and at least one further phase for activating a further set 22.2 and 22.4 of the reader heads. The switching is such that a complete cycle plus at least the first phase of a subsequent cycle is completed within a time period not longer than a reset period of the transponders. The reset period is the period between removal of an energizing signal from a transponder and the transponder re-entering a normal operational mode.

11 Claims, 7 Drawing Sheets

READER ARRANGEMENT FOR AN ELECTRONIC IDENTIFICATION SYSTEM HAVING A PLURALITY OF READER HEADS FOR ENERGIZING TRANSPONDERS

INTRODUCTION AND BACKGROUND

This invention relates to electronic identification systems including an interrogator and a plurality of transponders. The invention more particularly relates to interrogators or readers forming part of such systems, especially radio frequency (RF) identification systems.

Known electronic identification systems of the aforementioned kind include a reader including a transmitter for transmitting an energizing field or interrogation signal to the transponders; and a receiver for receiving a response signal from the transponders. A microprocessor in the reader identifies a particular transponder by identification code data unique to the transponder forming part of a backscattered response signal. Upon receipt of the identification code data by the reader and thus upon identification of the transponder, the reader transmits an acknowledgement signal to the transponder to switch the transponder to a catnap mode wherein it stops responding to the interrogation signal, while still being energized. After the energizing signal has been removed from the transponder for a period longer than a reset period (typically shorter than two seconds), the transponder reverts to a normal operational mode wherein it responds as hereinbefore described with identification code data upon being energized.

In applications where a large number of transponders mounted on articles to be identified need to be read, it may be necessary to scan the energizing field over the articles. Due to scattering and reflections of the energy, a remote transponder not yet in the field, may be energized and thus read as hereinbefore described. However, as the field is moved, the scattered energy is also removed from the transponder just read, so that the transponder will switch from the catnap mode to the normal operational mode. When the actual energizing field later illuminates that transponder, that transponder will be read a second time, resulting in errors in the data read and recorded.

OBJECT OF THE PRESENT INVENTION

Accordingly it is an object of the present invention to provide a apparatus and a method with which the applicant believes the aforementioned disadvantages may at least be alleviated.

SUMMARY OF THE INVENTION

According to the invention there is provided a reader arrangement for an electronic identification system, the reader arrangement including a plurality of reader heads for energizing transponders to be read; and control means for time multiplexing activation of the reader heads.

The activation may be multiplexed by switching activation of the reader heads in a multi-phase sequential pattern including a first phase for activating a first set of the reader heads and at east one further phase for activating at least one further set of said reader heads, so that a complete cycle plus at least the first phase of a subsequent cycle is completed within a time period not longer than a reset period of the transponders, the reset period being the period between removal of an energizing signal from a transponder and the transponder re-entering a normal operational mode.

The reader heads may be arranged in an array, such as a linear array or a rectangular array.

The reader heads in the first set and the reader heads in the at least one further set may be arranged in alternating relationship, so that radiation patterns associated with simultaneously activated heads do not overlap.

The arrangement may be stationary. In other embodiments at least the reader heads may be moveable past a volume including transponders to be read.

The reader arrangement may include a central reader and the control means may include fast switching switch means, for example PIN diodes, for connecting the heads to the central reader in the multi-phase sequence. Where a set comprises more than one reader head, the reader heads of that set may be connected to the reader via a power splitter arrangement.

In some embodiments, multiple reader arrays may be utilized and in such embodiments adjacent heads in neighbouring arrays are controlled such that they are not activated simultaneously.

The arrangement may further include at least one energizing means including at least one energizing signal transmitter for preventing the transponders from exiting the catnap mode and thus resetting to a normal operational mode of the transponder.

In some of these embodiments the reader head array may be positioned between a leading energizing array and a trailing energizing array.

At least some of the heads may be arranged such that central axes of radiation patterns associated with the heads extend transversely relative to one another. The axes may for example extend perpendicular relative to one another.

Each head may include an antenna adapted to transmit or receive signals the polarization of which is not limited to one plane.

Also included within the scope of the present invention is a reader arrangement for an electronic identification system including a plurality of reader heads, each head being associated with a radiation pattern wherein it transmits an energizing signal for energizing transponders; at least some of the heads being arranged such that the central axes of respective patterns extend substantially transversely relative to one another.

Yet further included within the scope of the invention is a reader arrangement for an electronic identification system including an antenna adapted to transmit or receive signals the polarization of which is not limited to one plane.

Still further included within the scope of the present invention is a reader head for an electronic identification system, the reader head including a plurality of energizing elements for energizing transponders to be read; and wherein the elements, in use, are activated in a time-division multiplexing manner.

The energizing elements may be first and second antenna elements arranged for transmitting or receiving signals polarized in first and second planes respectively and the elements may be activated by switching activation of the elements in a multi-phase sequential pattern including a first phase for activating the first element and a second phase for activating the second element, so that a complete cycle plus at least the first phase of a subsequent cycle is completed within a time period not longer than a reset period of the transponders, the reset period being the period between removal of an energizing signal from a transponder and the transponder reentering a normal operational mode.

Also included within the scope of the present invention is a method of reading a plurality of transponders including the steps of: providing a plurality of reader elements; and activating the elements in a time-division multiplexing manner, to energize the transponders.

Each transponder may be of a kind having an operational mode wherein it is responsive to energization by a reader by transmitting data to be received by the reader; and a catnap mode which the transponder enters after reception of the data has been acknowledged by the reader and wherein the transponder remains until energization is removed from the transponder, the transponder further being adapted to re-enter the operational mode a reset period after energization has been removed therefrom, the activating step may include the step of switching activation of the reader elements in a multi-phase sequential pattern comprising a first phase for activating a first set of said reader elements and at least one further phase for activating at least one further set of said reader elements, so that a complete cycle plus at least the first phase of a subsequent cycle is completed within a time period not longer than the reset period of the transponders.

The elements may form part of reader heads and in one embodiment of the method the reader heads may be kept stationary and may be arranged such that radiation patterns associated with the reader heads collectively cover a volume to be read.

In another embodiment, the method may include the steps of moving the reader heads past a volume to be read; and utilizing energizing means to keep transponders not in energizing fields associated with the reader heads in an operational mode, so that they are not affected by scattered energy originating from the reader heads and/or to keep transponders already read in the catnap mode.

BRIEF DESCRIPTION OF THE ACCOMPANYING DIAGRAMS

The invention will now further be described, by way of example only, with reference to the accompanying diagrams wherein FIG. 1 is a functional block diagram illustrating a prior art identification system;

DESCRIPTION OF PREFERRED EMBODIMENTS OF THE INVENTION

Figure 1:
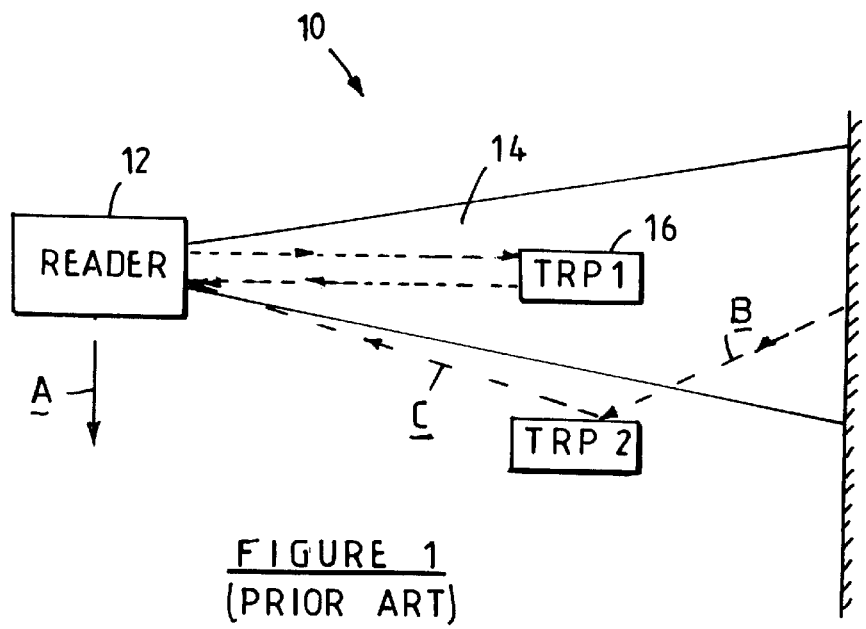

A prior art identification system is generally designated by the reference numeral 10 in FIG. 1.

The system 10 includes a reader 12 comprising a transmitter for transmitting an energizing field 14 or interrogation signal to transponders 16. The reader further comprises receiver means for receiving a response signal from the transponders. A microprocessor in the reader 12 identifies a particular transponder (such as $TRP_1$) from identification code data forming part of a backscattered response signal. The identification code data is unique to the transponder. Upon receipt of the data by the reader 12 and thus upon identification of the transponder $TRP_1$, the reader transmits an acknowledgement signal to switch the transponder to a catnap mode wherein it stops responding to the interrogation signal, while still being energized. Each time a transponder is switched as aforesaid, a counter in the reader is incremented, to keep count of the transponders read. After the energizing field 14 has been removed from the transponder for a period longer than a reset period (typically shorter than 2 seconds) the transponder 16 reverts to its normal operational mode wherein it will respond with the identification data upon being energized.

In applications where a large number of transponders mounted on articles to be counted need to be read, it may be necessary to scan the energizing field over the articles. This may be done by moving the reader 12 in direction A. Due to scattering and reflections along lines B and C of the energy transmitted by the reader 12, a remote transponder $TRP_2$ not yet in the field 14 may be energized, read and switched to the catnap mode. However, as the field is moved, the incidental scattered energy is removed from the transponder $TRP_2$, so that after the aforementioned reset period, the transponder $TRP_2$ switches to the normal operational mode again. In this mode it can be read again. Thus, when the actual energizing field later illuminates the transponder $TRP_2$, that transponder will be read again, resulting in errors in the data read and recorded.

Figure 2:
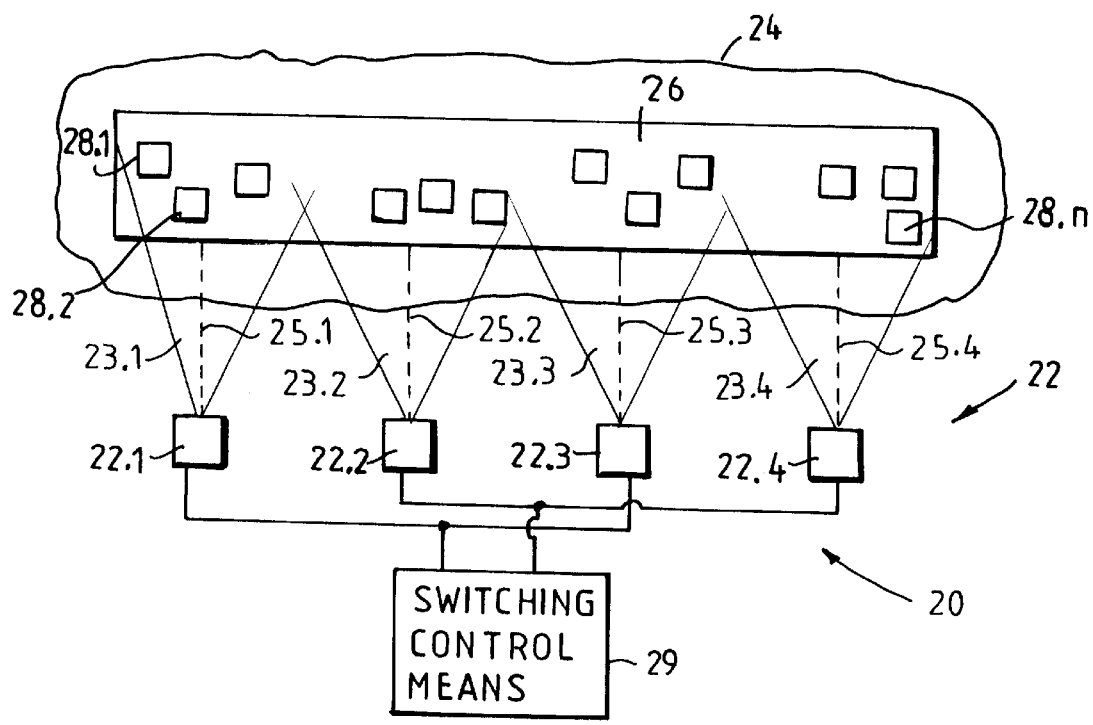
FIG. 2 is a functional block diagram of a system including a reader arrangement according to the invention.

In FIG. 2, there is shown a block diagram of a system 20 for alleviating the aforementioned problem. The system comprises a reader head arrangement 22 including a plurality of spaced reader heads 22.1 to 22.4 arranged in an array, to cover a reading volume 24. A reading volume is a volume that contains transponders that must be subjected to identification recording or identification verification procedures. The reading volume may be defined by a shelf 26 and the transponders (not shown) may be mounted on articles 28.1 to 28.n of a similar nature, which articles must be counted by the aforementioned procedures. Each head is associated with a respective radiation pattern 23.1 to 23.4 of generally conical shape having a respective central axis 25.1 to 25.4.

The system further comprises switch control means 29 connected to the reader heads 22.1 to 22.4 for time-division multiplexing activation of the heads by switching activation of the heads in a multi-phase sequential pattern comprising a first phase for activating a first set of said reader heads only and at least a second phase for activating another set of said reader heads only, so that a complete activation cycle plus at least the first phase of a subsequent cycle is completed within a time period equal to the aforementioned reset period of the transponders.

In the first phase, only reader heads 22.1 and 22.3 are activated simultaneously and in the second phase, only heads 22.2 and 22.4 are activated simultaneously. In this way adjacent ones of the reader heads 22.1 to 22.4 are not switched on simultaneously, so that the effects of multi-path signals and signal cancellation may be alleviated.

Figure 3:
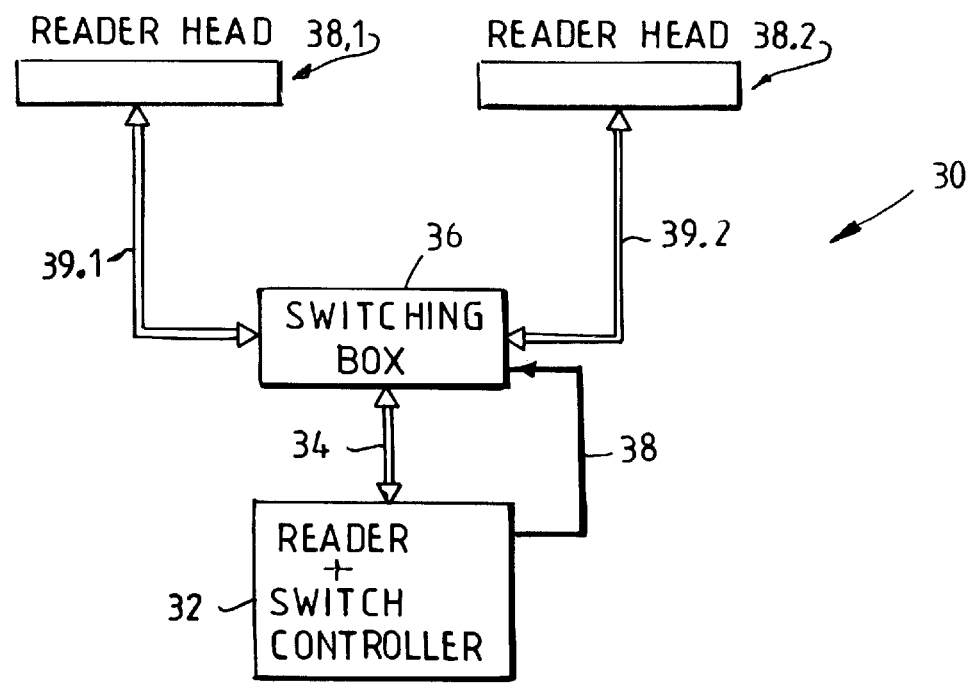
FIG. 3 is a block diagram of a reader arrangement including an array of reader heads and control means therefor.

A second embodiment of the reader arrangement is designated 30 in the block diagram in FIG. 3. The arrangement 30 comprises a reader and switch controller 32 connected by coaxial cable 34 to a switching box 36. Signals to be transmitted and signals received propagate in said cable. Switch control lines 38 connected between the controller 32 and the box 36, transmit switch control signals to the box 36. Reader head 38.1 is connected via cable 39.1 to the box 36 and reader head 38.2 is connected via cable 39.2 to the box 36. In this dual head configuration, heads 38.1 and 38.2 are activated alternately and repeatedly in cycles during the identification recording and identification verification procedures, so that a complete cycle plus the first phase of a subsequent cycle is completed within the reset period.

Figure 4:
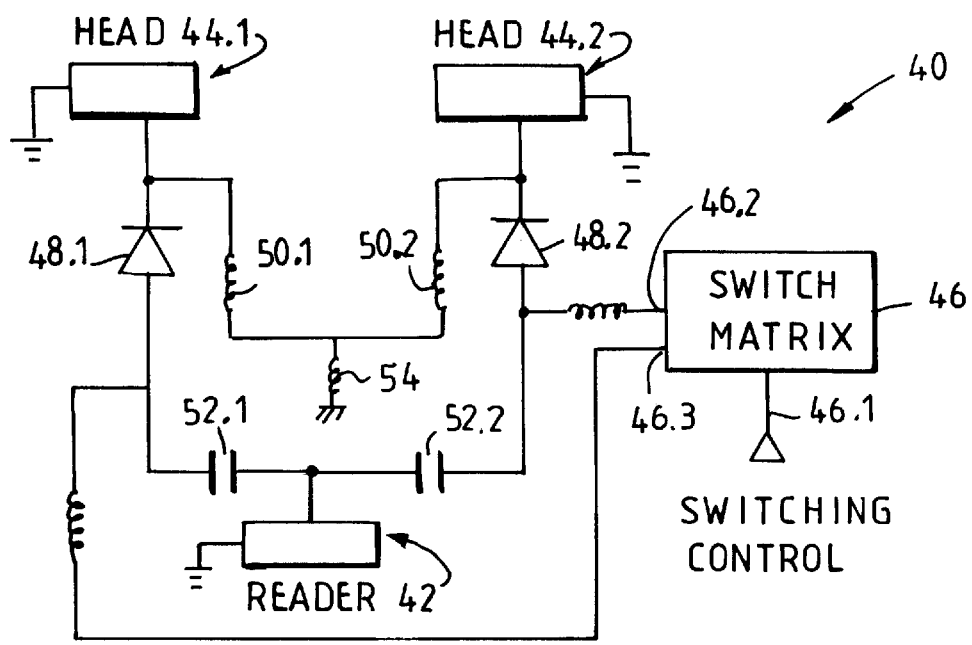
FIG. 4 is a more detailed diagram of the array and switch control means therefor.

Because of the fast switching speeds required, a system of fast semiconductor switches is used to cycle the activation pattern. An example of a suitable circuit is designated 40 in FIG. 4. The circuit comprises a central reader 42 connected to reader heads 44.1 and 44.2. A controller 46 in the form of a switching matrix is also connected to the circuit. The circuit further comprises PIN diode switches 48.1 and 48.2, isolation chokes 50.1 and 50.2 having a very high impedance at the operating frequency, isolation capacitors 52.1 and 52.2 to prevent switching voltages from reaching the reader 42 and a current limiting and bias resistor 54.

The signal at the switching control input 46.1 is a dual state binary signal. The switching matrix causes logic high and logic low signals to appear alternately and repeatedly at outputs 46.2 and 46.3. The signal at output 46.2 is out of phase with the signal at output 46.3. When output 42.3 is high, a high voltage is applied to diode 48.1 and current flows through the diode switch causing it to conduct and thus passing the reader transmit and receive signals to and from head 44.1. The current also flows through the resistor 54, causing diode 48.2 to be reverse biased and therefore provides isolation of head 44.2 from the reader 42. When output 46.2 becomes high, diode 48.2 is forward biased to pass the reader transmit and receive signals to and from head 44.2 and diode 48.1 is reverse biased, to provide isolation of head 44.1 from the reader 42.

Figure 5:
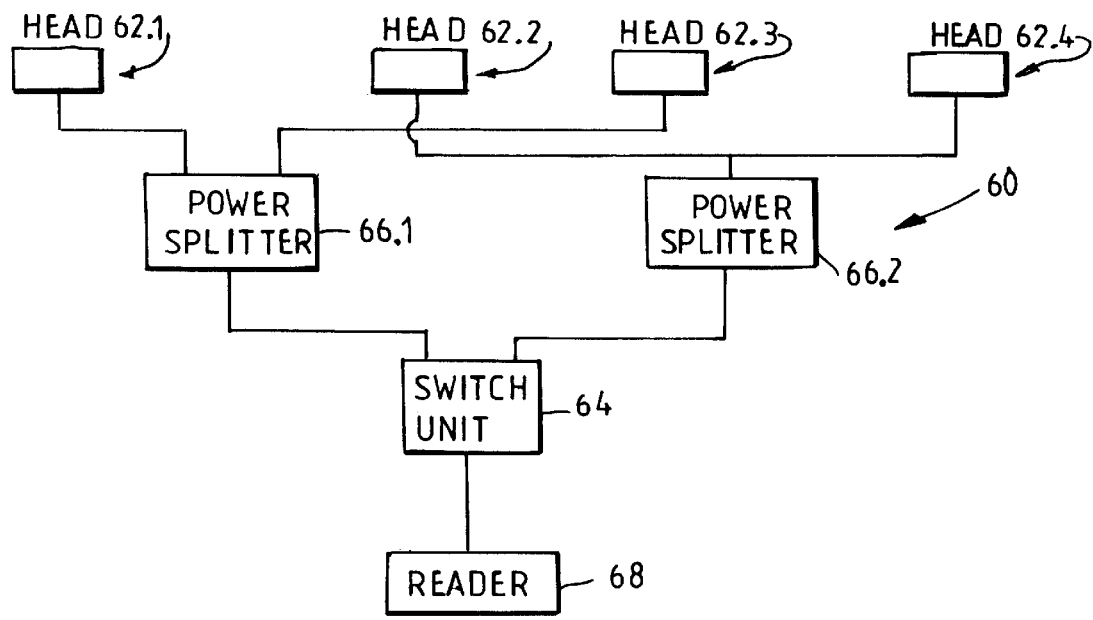
FIG. 5 is a block diagram of another embodiment of a reader head array and control means therefor.

As shown in FIG. 5 with system 60, when four or more heads 62.1 to 62.4 are used to cover the reading volume, heads 62.1 and 62.3 which are activated simultaneously are connected to a switch unit 64 via power splitter 66.1 and heads 62.2 and 62.4 which are activated simultaneously, but sequentially with heads 62.1 and 62.3, are connected via a power splitter 66.2 to switch unit 64. Switch unit 64 is connected to the reader 68.

Figure 6:
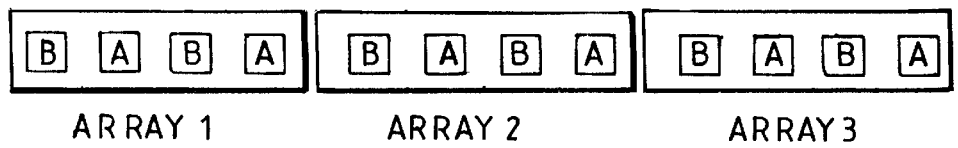
FIG. 6 is a diagram illustrating the configuration of reader heads in multiple linear arrays.
Figure 7:
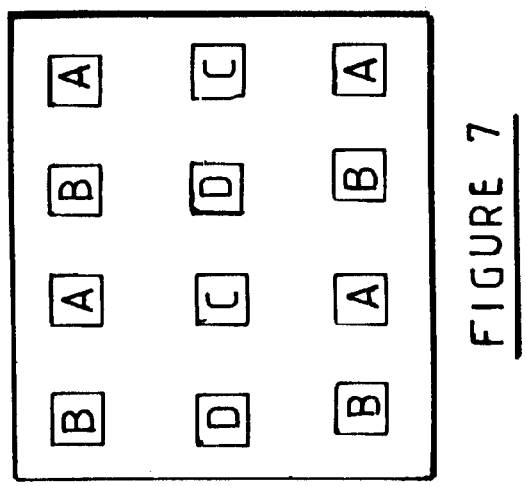
FIG. 7 is a diagram of the configuration of reader heads in a rectangular array.

The reader arrangement or reader head arrangement may be in the form of an array, such as a linear array or a rectangular array. These configurations are shown in FIGS. 6 and 7. When more than one array is used (as shown in FIG. 6) the control is such that adjacent heads in two neighbouring arrays are not activated at the same time. In the arrangements shown in FIGS. 6 and 7, the heads marked A are switched simultaneously, thereafter the heads marked B, thereafter the heads marked C, thereafter the heads marked D and thereafter the heads marked A, all within a time period equal to or shorter than the aforementioned reset period.

With such an arrangement an entire reading volume is covered with the stationary reader heads. Since adjacent reader heads are not activated simultaneously, the effects of multipath signals and signal cancellation is reduced. Furthermore, after a first cycle of the identification procedure, the transponders already read are cyclically re-energized within their reset periods during each cycle of the verification procedure, thereby to prevent them from switching from the catnap mode to the normal operational mode wherein they could be read for a second time. During the verification cycles, only transponders not read during preceding cycles are read. At the end of the verification procedure all the transponders should have been read and a total number equal to the number of transponders and thus articles in the volume should be available.

Figure 8:
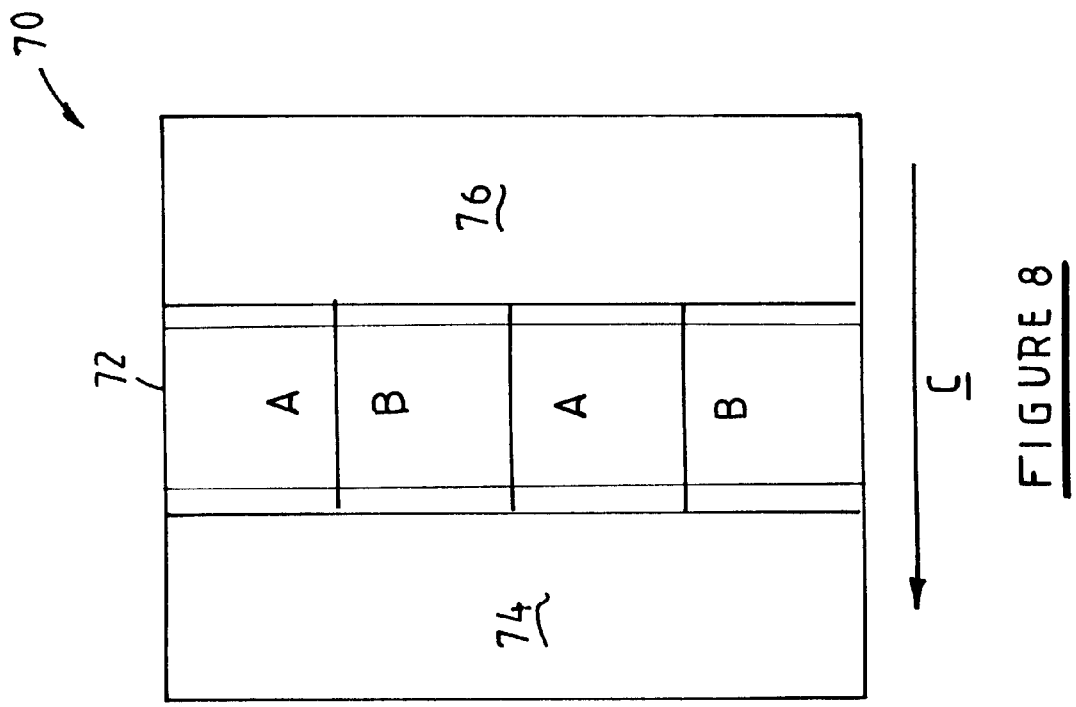
FIG. 8 is a diagram illustrating a mobile reader arrangement according to the invention.

Another embodiment of the reader arrangement according to the invention is shown in FIG. 8. In this embodiment a mobile reader arrangement 70 includes a reader array 72 including heads A and B and which array is flanked by a leading energizing array 74 and a trailing energizing array 76.

The assembly is caused to move in direction C, along a reading volume (not shown) to read transponders (also not shown) located in that volume. The reader array 72 operates on the principles described hereinbefore in that: readers in the array are activated sequentially within the reset period, adjacent readers are not activated at the same time; and upon having read a transponder, that transponder is acknowledged and switched to the catnap mode. The energizing arrays on the other hand do not read the transponders nor acknowledge receipt of the identification code (thereby to switch the transponders to the catnap mode), but keep the transponders that have been read in the catnap mode. It is believed that this configuration also relieves the effects of scattering and accidental double reading of transponders illuminated by scattered energization signals.

Figure 9:
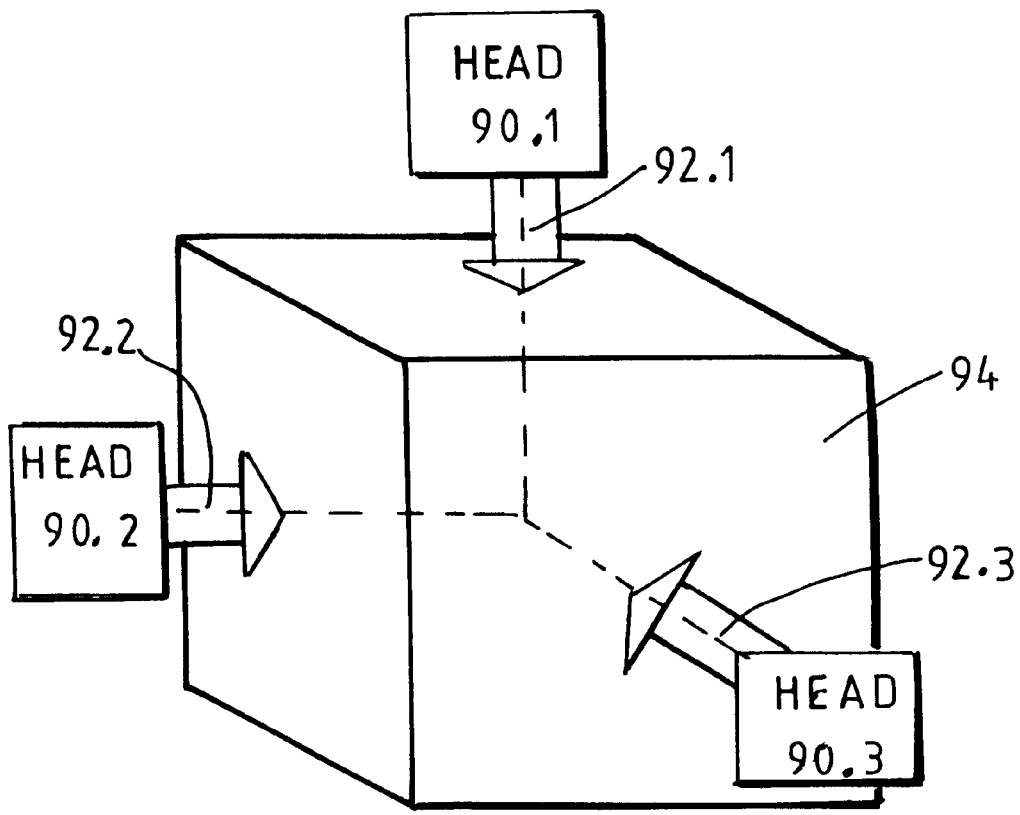
FIG. 9 is a diagram illustrating another embodiment of a reader arrangement according to the invention.

A further embodiment of the invention is diagrammatically illustrated in FIG. 9. In this embodiment the reader heads 90.1 to 90.3 of the arrangement are arranged such that the central axes 92.1 to 92.3 of their radiation patterns extend transversely relative to one another, preferably substantially orthogonally relative to one another through the reading volume 94. The heads are preferably activated in a sequential pattern as hereinbefore described and may transmit on the same or different frequencies, to ensure that randomly orientated transponders are all energized and read. Larger arrangements of simultaneously activated heads may also be provided.

The invention further extends to a reader head including an antenna arrangement adapted to transmit an interrogation signal with its polarization not limited to one plane and to receive response signals the polarization of which is also not limited to one plane.

Figure 10:
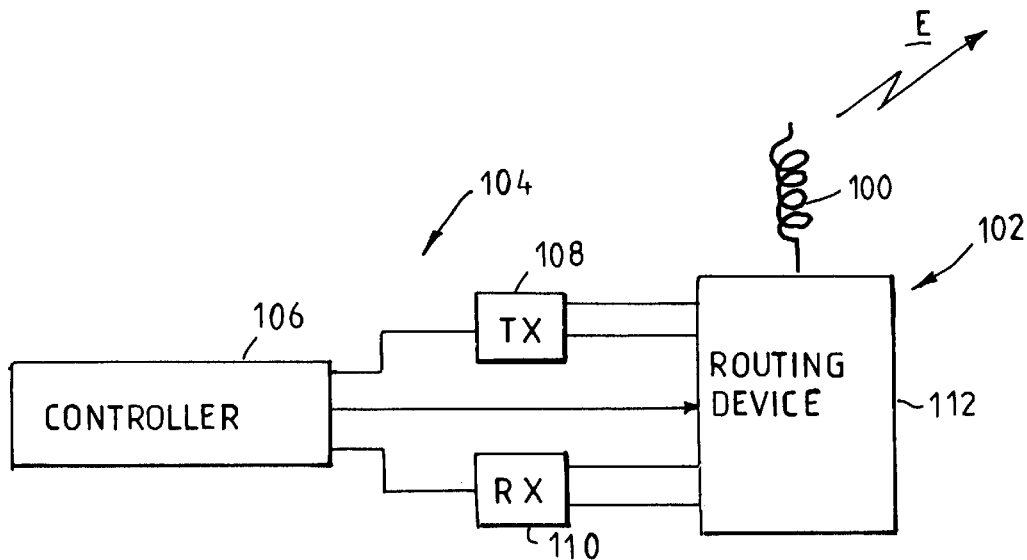
FIG. 10 is a block diagram of a reader head according to the invention including an antenna.

In a first embodiment shown in FIG. 10, the antenna element 100 of head 102 is helically shaped, so that a circularly polarized signal E is transmitted. The head 104 further includes a controller 106 for controlling a transmitter 108 for generating the energizing signal E, a receiver 110 for receiving the backscatter modulated signal and a routing device 112 for connecting either the transmitter 108 or the receiver 110 to the antenna element 100.

With such an antenna element 100, transponders (not shown) the antennas (also not shown) of which are orientated randomly relative to the orientation of the antenna element 100, will be able to receive the energizing signal E. Furthermore, the antenna element 100 will also be able to receive randomly polarized backscatter modulated signals from the transponders.

Figure 11:
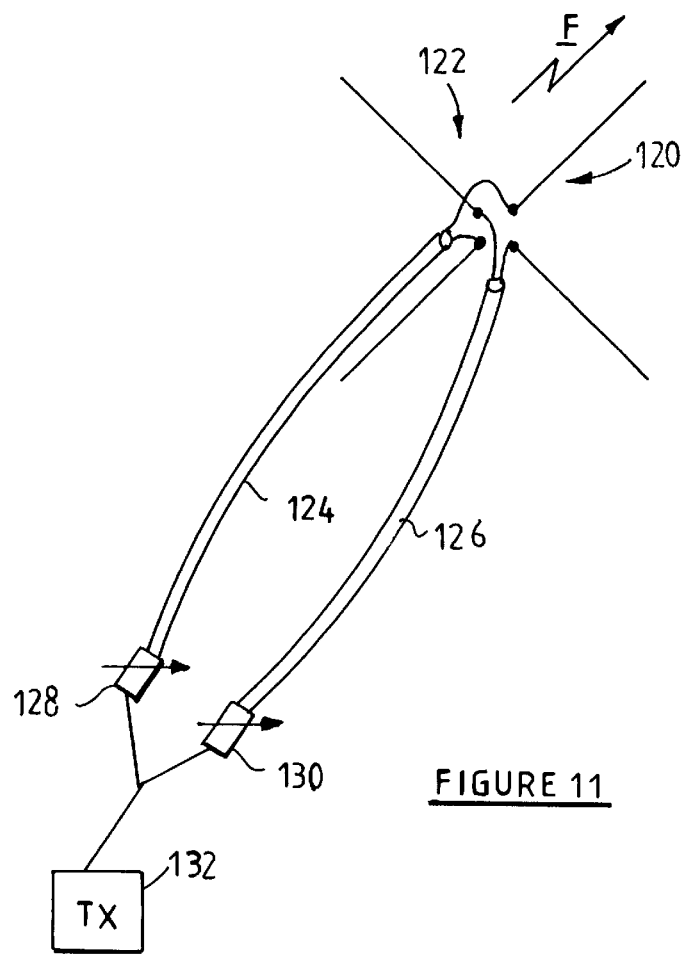
FIG. 11 is a basic block diagram of another antenna arrangement for a reader head.

In another embodiment shown in FIG. 11 two orthogonal linear antenna elements 120 and 122 are connected at their respective feed points to feed lines 124 and 126 respectively. In feed lines 124 and 126 there are provided adjustable delay line elements 128 and 130 respectively. The feed lines 124 and 126 are connected to transmitter 132. By adjusting the delay line elements by means of a controller (not shown), the phases of the signals propagating in the fines 124 and 126 are adjustable relative to one another, resulting in non-linear polarization of the transmitted energizing signal F.

The non-linear polarized signal F should be receivable by the antennas (not shown) of transponders (also not shown) orientated randomly relative to the antenna elements 120 and 122.

Figure 12:
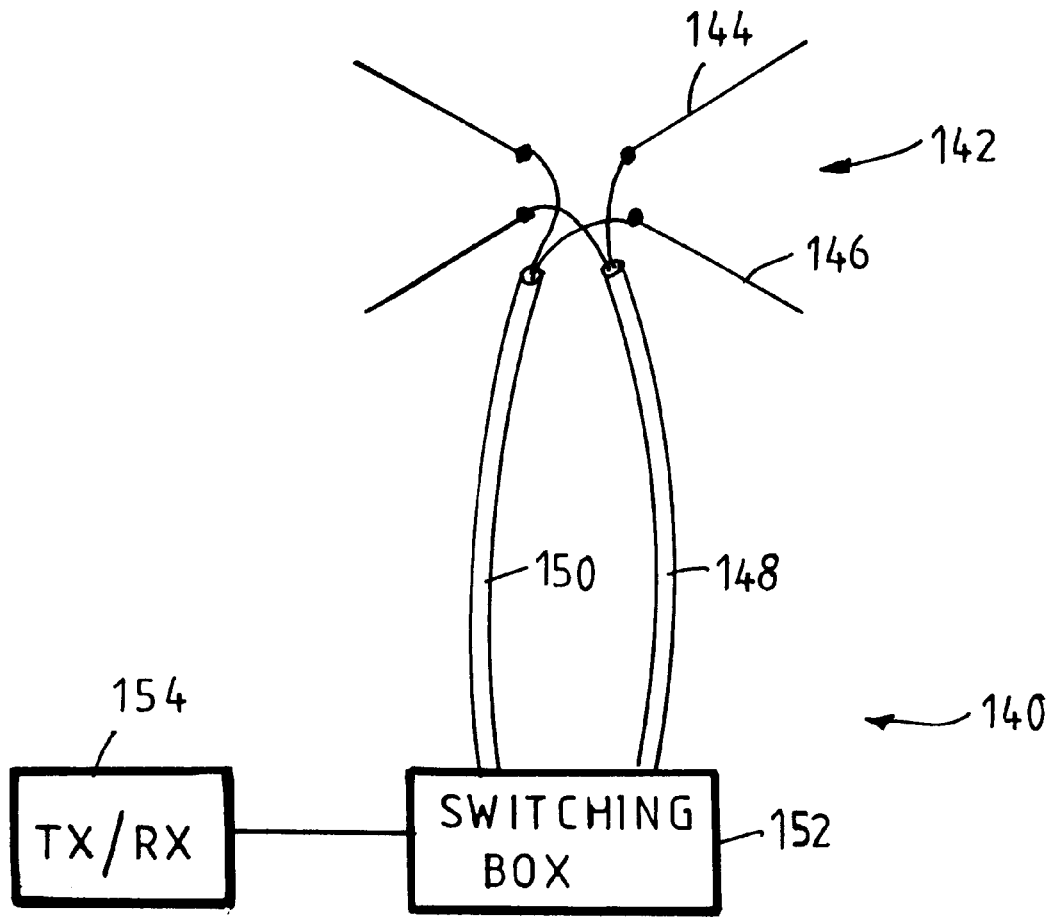
FIG. 12 is a basic block diagram of another reader head according to the invention.

In FIG. 12 there is shown a further embodiment of a reader head according to the invention. The head 140 includes an antenna arrangement 142 including vertically and horizontally polarized antenna elements 144 and 146 respectively. Elements 144 and 146 are connected to switching box 152 via cables 148 and 150, respectively. The switching box is connected to transceiver 154.

The switching box serves to connect the transceiver 154 repeatedly and alternately to elements 144 and 146, at a rate wherein one cycle plus the first phase of a subsequent cycle is completed within a time period equal to or shorter than the reset period of transponders to be read.

It will be appreciated that there are many variations in detail on the system, reader arrangement and method according to the invention without departing from the scope and spirit of the appended claims.

We claim:

1. A reader arrangement for an electronic identification system, the reader arrangement comprising a plurality of reader heads for energizing transponders to be read; and control means for time multiplexing activation of the reader heads, the activation being multiplexed by switching activation of the reader heads in a multi-phase sequential pattern including a first phase for activating a first set of the reader heads and at least one further phase for activating at least one further set of said reader heads, so that a complete cycle plus at least the first phase of a subsequent cycle is completed within a time period not longer than a reset period of the transponders, the reset period being the period between removal of an energizing signal from a transponder and the transponder re-entering a normal operational mode.

2. A reader arrangement as claimed in claim 1 wherein the reader heads are arranged in an array.

3. A reader arrangement as claimed in claim 2 including a plurality of arrays of reader heads, the controller further being arranged to activate heads on either side of an interface between adjacent arrays in alternative phases of a cycle.

4. A reader arrangement as claimed in claim 1 wherein the reader heads in the first set and the reader heads in the at least one further set are arranged in alternating relationship.

5. A reader arrangement as claimed in claim 1 which is stationary.

6. A reader arrangement as claimed in claim 1 in which at least the reader heads are moveable past a volume including transponders to be read.

7. A reader arrangement as claimed in claim 1 including a central reader and wherein the control means includes fast switching means for connecting the reader heads to the reader.

8. A reader arrangement as claimed in claim 1 including at least one additional energizing means for energizing transponders, to prevent them from resetting to a normal operational mode of the transponder.

9. A reader arrangement as claimed in claim 1 wherein at least some of the heads are arranged such that central axes of radiation patterns associated with the heads extend transversely relative to one another.

10. A reader arrangement as claimed in claim 9 wherein the axes extend substantially perpendicular relative to one another.

11. A reader arrangement as claimed in claim 1 wherein each head includes an antenna adapted to transmit or receive signals the polarization of which is not limited to one plane.

* * * * *